United States Patent
Wang et al.

(10) Patent No.: US 6,695,972 B2
(45) Date of Patent: Feb. 24, 2004

(54) FORMULA AND PREPARATION METHOD FOR MULTI-LAYER CHIP INDUCTOR MATERIAL USED IN VERY HIGH FREQUENCIES

(75) Inventors: Xiaohui Wang, Beijing (CN); Longtu Li, Beijing (CN); Ji Zhou, Beijing (CN); Shuiyuan Su, Beijing (CN); Zhilun Gui, Beijing (CN); Zhenxing Yue, Beijing (CN); Zhenwei Ma, Beijing (CN); Li Zhang, Beijing (CN)

(73) Assignees: Tsinghua Tongfang Co., Ltd., Beijing (CN); Tsinghua University, Beijing (CN)

( * ) Notice: Subject to any disclaimer, the term of this patent is extended or adjusted under 35 U.S.C. 154(b) by 25 days.

(21) Appl. No.: 10/046,878

(22) Filed: Jan. 14, 2002

(65) Prior Publication Data

US 2003/0052298 A1 Mar. 20, 2003

(30) Foreign Application Priority Data

Jul. 19, 2001 (CN) .......................... 01120531 A

(51) Int. Cl.$^7$ ................................ H01F 1/03
(52) U.S. Cl. ................. 252/62.63; 252/62.6; 252/62.62
(58) Field of Search ............................. 252/62.63, 62.6, 252/62.62

(56) References Cited

U.S. PATENT DOCUMENTS 5,954,992 A * 9/1999 Onizuka et al. .......... 252/62.63
2002/0108677 A1 * 8/2002 Wang et al. ................. 148/122

* cited by examiner

Primary Examiner—C. Melissa Koslow
(74) Attorney, Agent, or Firm—Merchant & Gould P.C.

(57) ABSTRACT

This invention relates to the formula and preparation method for a multi-layer chip inductor material used in very high frequencies. The main composition of this material is planar hexagonal soft magnetic ferrite, and ingredient is low temperature sintering aid. Preparation method is a synthetic method of solid phase reaction. The sintering aid is prepared by secondary doping. By the process of ball grinding, drying, pre-calcining, ball grinding, drying, granulating, forming, sintering, and so forth, very high frequency inductor material of superior quality is obtained, realizing low temperature sintering under a temperature lower than 900° C. This invention is of low cost, high performance, suitable for multi-layer chip inductors at very high frequencies of 300M–800 MHz.

3 Claims, 4 Drawing Sheets

FORMULA AND PREPARATION METHOD FOR MULTI-LAYER CHIP INDUCTOR MATERIAL USED IN VERY HIGH FREQUENCIES

This invention relates to the formula and preparation method for low-temperature sintering, multi-layer chip inductor material of high performance used in very high frequencies. This invention is classified into the field of new material technologies.

Multi-layer chip inductors or multi-layer ferrite inductors (MLCI or MLFI for short) are of monolithic structure sintered together by ferrite material and internal screw type serial electrodes. The key of the process technology lies in the sintering together of ceramic medium material (soft magnetic ferrite) and internal conducting material (in consideration of conductivity, cost, and other respects, silver is the best selection). This requires that the soft magnetic ferrite possess a lower sintering temperature and a high permeability as well as high factor of quality. At present, the multi-layer chip inductor materials at home and abroad are mainly NiZnCu ferrite of low sintering temperature and low dielectric ceramics. The working frequencies of NiZnCu low sintering temperature ferrite and its device are generally less than 200 MHz. When Zn is not included in its compositions, its working frequencies are maximized to 300 MHz. The permeability of the low dielectric ceramics is usually 1, therefore can only be used in the frequencies above ultra-high frequency (800 MHz), where less inductance is required. In the very high frequencies of 300 MHz–800 MHz, which are commonly used in mobile telecommunication, IT techniques, television and defense field, there is no ferrite material of high performance and low sintering temperature yet up till now. Only low dielectric ceramics can be used as medium to manufacture multi-layer chip inductors of low inductance as substitutes.

Planar hexagonal ferrite of anisotropic Z-type, $Ba_3Co_2Fe_{24}O_{41}(Co_2Z)$, was discovered by Holland's Philips Lab in the late 50s. It has natural resonance frequencies between 1.3–3.4 GHz, possessing superior electric-magnetic properties, therefor, it is widely used in very high frequencies and microwave section. However, because of the complex crystal structure of Z-type ferrite, its phase-forming and sintering temperature is up to about 1300 °C. In order to use it as material for multi-layer chip inductors, its sintering temperature must be reduced to about 900° C. so as to be able to sinter together with silver internal electrodes. Current technologies have been able to prepare low temperature sintering multi-layer chip inductor material of $Co_2Z$ series of planar hexagonal ferrite. The low temperature for sintering can be lower than 900° C., and permeability is 4–8. However, this kind of chemical powder preparation method is complex in process, relatively higher in cost.

The purpose of this invention is to provide a formula and preparation method for a material used in multi-layer chip inductors for very high frequencies, and to realize low temperature sintering below 900° C. by adopting solid-phase synthetic method so as to obtain the material and to meet the requirement on multi-layer material used in 300 MHz–800 MHz very high frequencies with a simple preparation process, low cost, and high performances.

The composition of the material of very high frequency multi-layer chip inductors provided by this invention are as follows: The main composition is planar hexagonal soft magnetic ferrite, of which the molecular formula is $Ba_{3-x}Sr_xCo_{2-y-z}Zn_yCu_zMn_wFe_{24-w-v}O_{41}$, in which $0 \leq X \leq 2$, $0 \leq Y \leq 2$, $0 \leq Z \leq 2.0$, $0 \leq W \leq 1.0$, $0 \leq V \leq 1.0$. Ingredient is low temperature sintering aid consisting of one or more than one composition of bismuth oxide, vanadium oxide, cadmium oxide, calcium oxide, silicon oxide, lead-oxide, boron oxide, lead fluoride, lithium fluoride, calcium fluoride, boron-lead glass, lithium carbonate or lithium borate. The percentage of main composition in the total weight of this material is 99–88%. The secondary doping in the ingredient accounts 1–12% of the total weight of the material.

The inductor material with the above formula can be prepared through the following synthetic method of solid phase reaction, of which the steps are:

(1) Synthesizing of main composition, planar hexagonal soft magnetic ferrite: On the basis of the molecular formula, select raw material from $Fe_2O_3$, $SrCO_3$ or SrO, $BaCO_3$ or BaO, $Co_3O_4$ or CoO, ZnO, CuO, $Mn_2O_3$ or $MnO_2$ or $MnCO_3$; Weigh according to molecular formula stoichiometry ratio; Ball grind for 2–48 hr after mixing, taking water as the medium;

(2) Bake dry the slurry obtained by ball grinding in step (1), and pre-calcining at 1000–1300° C., resulting in main composition type Z: planar hexagonal soft magnetic ferrite;

(3) Mixing secondary doped sintering aid with the main composition according to formula and ball-grind for 2–48 hr with water as medium;

(4) Bake dry the slurry obtained in step (3), sieve with 100–200 mesh size, granulate, and moulding;

(5) Sintering at 860–920° C. for 1–10 hr.

By the use of the formula and preparation process of this invention, preparation can be made of pure $Co_2Z$ and doped Z type soft magnetic ferrite of planar hexagonal series, and 900° C. low temperature sintering can be realized. Adjusting formula and process, materials for multi-layer chip inductors can be obtained of high performance used in very high frequencies. Compared with current techniques, the advantages of this material are that the formula is adjustable; the sintering temperature is low and temperature range is wide; the process is simple; the cost is low; the properties are stable and reliable; the electromagnetic properties are superior with permeability being 10 when sintering below 900° C.

Figure Explanation

The following are further descriptions of this invention in combination with figures and practical application examples.

Embodiment 1

Figure 1:
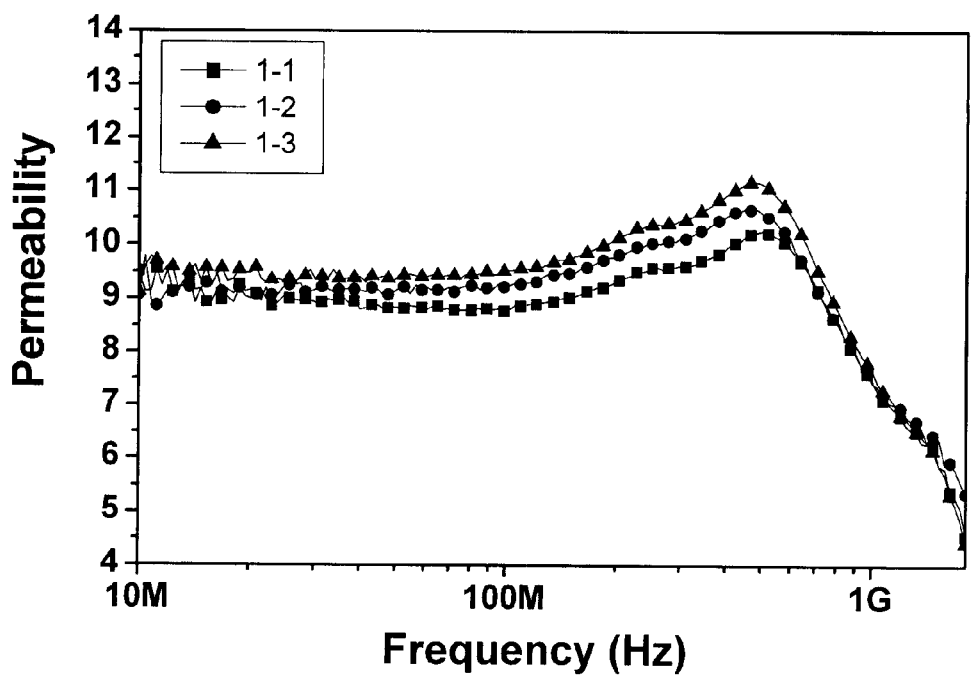
FIG. 1 is the magnetic spectrum curves of a group of samples by using this invention.
Figure 2:
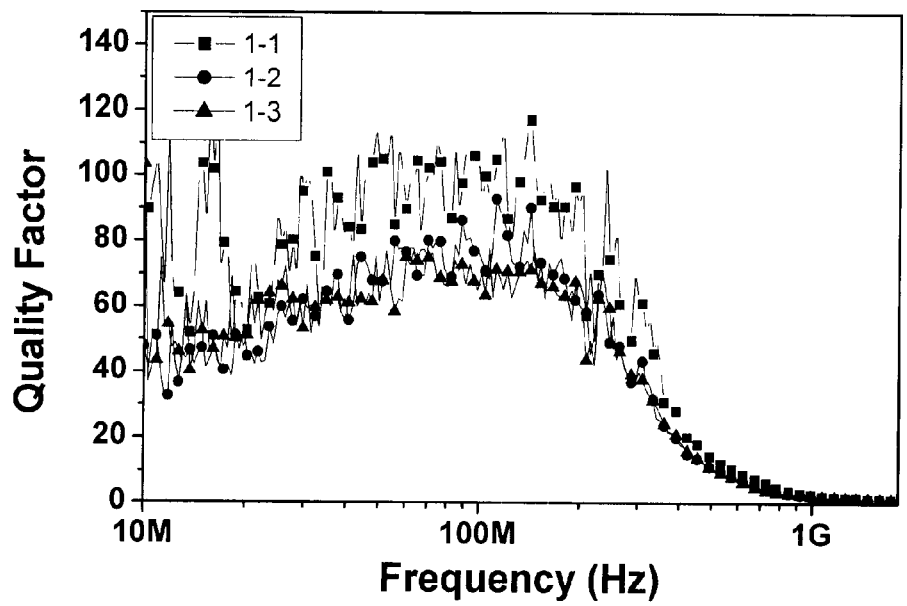
FIG. 2 is the quality factor curves corresponding to FIG. 1.

Using solid state synthetic method to prepare planar hexagonal Z-type soft magnetic ferrite $Ba_3Co_{1.0}Zn_{0.8}Cu_{0.2}Fe_{23}MnO_{41}$, where sintering aid is bismuth oxide and silicon oxide, and raw materials are $BaCO_3$, $Co_3O_4$, $ZnO$, $CuO$, $Mn_2O_3$, $Fe_2O_3$ taken according to stoichiometry ratio as 59.20 g, 8.03 g, 6.511 g, 1.591 g, 7.89 g, 183.6 g respectively. After mixed all these compositions, ball-grind for 24 hours. Baked dry, pre-calcining at 1,000–1,300° C. to form soft magnetic ferrite. Take ferrite powder 20 g; add sintering aid of 3% in weight of all compositions; ball-grind for 24 hours; bake dry; sieve with 100–200 mesh screen; moulding; sintering at 870° C., 890° C., and 920° C. for 6 hours and mark sample 1-1, 1-2, and 1-3 respectively. For circular ring samples, their outer diameter is 20 mm; inner diameter, 10 mm, thickness, 3 mm; and forming pressure, 7 MPa. For circular sheet samples, their diameter is 10 mm; thickness, 1 mm; and forming pressure, 2 MPa. The sintered ceramic sheets are measured for electric resistivity after coated with silver on upper and lower surfaces. The sintered circular ring samples are measured for magnetic spectrum and temperature characteristics by the use of HP4291B (1 MHz–1.8 GHz) radio-frequency impedance analyzer (measuring temperature range is −55–120° C.). FIG. 1 shows the magnetic spectrum curves of the samples. Initial permeability can reach approximately 10, and cut-off frequency is above 1.5 GHz. FIG. 2 gives the corresponding quality factor curves. The property parameters of the samples are listed in Table 1, in which the meanings of the parameters are as follows:

$\mu_i$ is initial permeability of the material.
Q is quality factor of the material.
$(\alpha_\mu)_{rel}$ is relative temperature coefficient.
$\rho$ is electric resistivity of the material.

TABLE 1

| Sample | Sintering Condition | $\mu_i$ | Q (300 MHz) | $(\alpha_\mu)_{rel}$ (/° C.) | $\rho$ ($\Omega \cdot cm$) |
|---|---|---|---|---|---|
| 1-1 | 870° C./6 h | 9.0 | 60 | $1.2 \times 10^{-6}$ | $8.4 \times 10^8$ |
| 1-2 | 890° C./6 h | 9.4 | 42 | $9.8 \times 10^{-7}$ | $9.1 \times 10^8$ |
| 1-3 | 920° C./6 h | 9.7 | 40 | $2.0 \times 10^{-6}$ | $2.3 \times 10^9$ |

Embodiment 2

Figure 3:
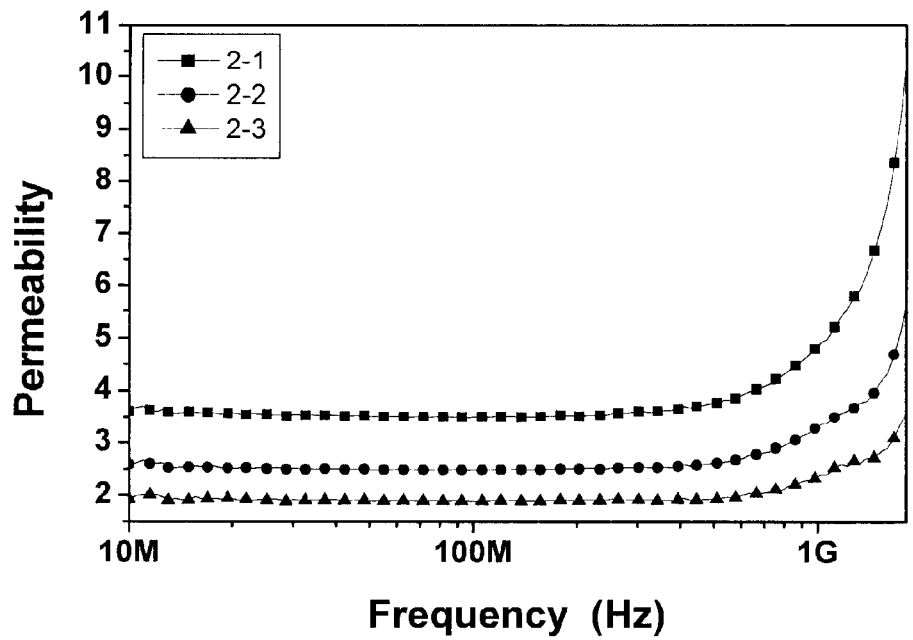
FIG. 3 is the magnetic spectrum curves of another group of samples by using this invention.
Figure 4:
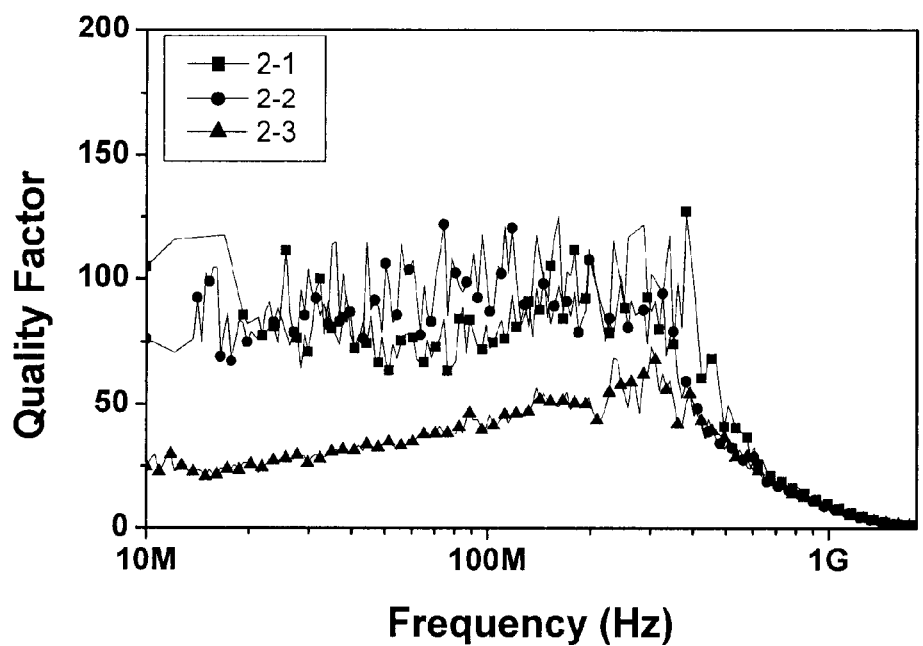
FIG. 4 is the quality factor curves corresponding to FIG. 3.

Using solid phase synthetic method to prepare planar hexagonal Z-type soft magnetic ferrite $Ba_{1.5}Sr_{1.5}Co_2Fe_{23}MnO_{41}$, where sintering aid is boron oxide and lead oxide, and raw materials are $BaCO_3$, $SrCO_3$, $Co_3O_4$, $Mn_2O_3$, $Fe_2O_3$ taken according to stoichiometry ratio as 29.60 g, 22.14 g, 16.05 g, 7.89 g, 183.6 g respectively. After mixed all these compositions, ball-grind for 24 hours. Baked dry, pre-calcining at 1,000–1,300° C. to form Z-type soft magnetic ferrite. Take ferrite powder 20 g each; add sintering aid of 3, 6, 9% respectively in weight of all compositions; ball-grind for 12 hours; bake dry; sieve with 100–200 mesh screen; moulding; sintering at 890° C. for 6 hours and mark sample 2-1, 2-2, and 2-3 respectively. For circular ring samples, their outer diameter is 20 mm; inner diameter, 10 mm; thickness, 3 mm; and forming pressure, 7 MPa. For circular sheet samples, their diameter is 10 mm; thickness, 1 mm; and forming pressure, 2 MPa. The sintered ceramic sheets are measured for electric resistivity after coated with silver on upper and lower surfaces. The sintered circular ring samples are measured for magnetic spectrum and temperature characteristics by the use of HP4291B (1 MHz–1.8 GHz) radio-frequency impedance analyzer (measuring temperature range is −55–120° C.). FIG. 3 shows the magnetic spectrum curves of the samples. Initial permeability is 2–4, and cut-off frequency is above 1.8 GHz. FIG. 4 gives the corresponding quality factor curves. The property parameters of the samples are listed in Table 2, in which the meanings of the parameters are as follows:

$\mu_i$ is initial permeability of the material.
Q is quality factor of the material.
$(\alpha_\mu)_{rel}$ is relative temperature coefficient.
$\rho$ is electric resistivity of the material.

TABLE 2

| Sample | Sintering Condition | $\mu_i$ | Q (300 MHz) | $(\alpha_\mu)_{rel}$ (/° C.) | $\rho$ ($\Omega \cdot cm$) |
|---|---|---|---|---|---|
| 2-1 | 890° C./6 h | 3.7 | 85 | $2.4 \times 10^{-6}$ | $3.9 \times 10^8$ |
| 2-2 | 890° C./6 h | 2.7 | 80 | $1.2 \times 10^{-6}$ | $5.3 \times 10^8$ |
| 2-3 | 890° C./6 h | 2.0 | 50 | $1.7 \times 10^{-6}$ | $4.7 \times 10^8$ |

Embodiment 3

Figure 5:
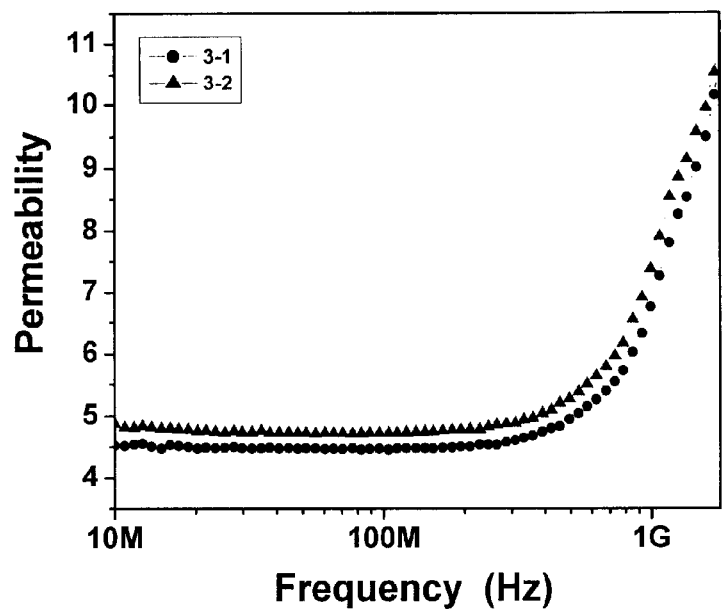
FIG. 5 is the magnetic spectrum curves of a group of samples by using this invention.
Figure 6:
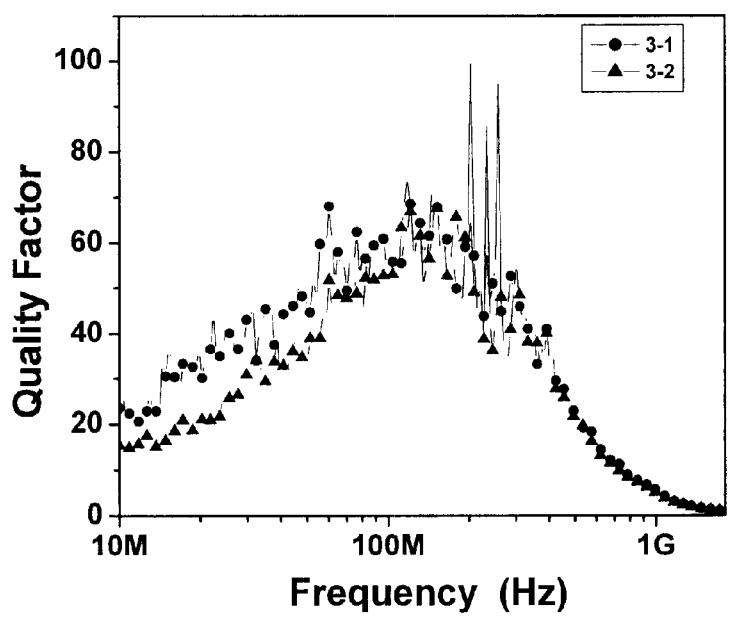
FIG. 6 is the quality factor curves corresponding to FIG. 5.

Using solid phase synthetic method to prepare planar hexagonal Z-type soft magnetic ferrite $Ba_3Co_2Fe_{24}O_{41}$, where sintering aid is lead fluoride, and raw materials are BaO, $Co_3O_4$, $Fe_2O_3$ taken according to stoichiometry ratio as 45.96 g, 16.05 g, 191.6 g respectively. After mixed all these compositions, ball-grind for 24 hours. Baked dry, pre-calcining at 1,000–1,300° C. to form Z-type soft magnetic ferrite. Take ferrite powder 20 g each; add sintering aid of 6% in weight of all compositions; ball-grind for 24 hours; bake dry; sieve with 100–200 mesh screen; moulding; sintering at 890° C. for 4,8 hours each and mark sample 3-1 and 3-2 respectively. For circular ring samples, their outer diameter is 20 mm; inner diameter, 10 mm; thickness, 3 mm; and forming pressure, 7 MPa. For circular sheet samples, their diameter is 10 mm; thickness, 1 mm; and forming pressure, 2 MPa. The sintered ceramic sheets are measured for electric resistivity after coated with silver on upper and lower surfaces. The sintered circular ring samples are measured for magnetic spectrum and temperature characteristics by the use of HP4291B (1 MHz–1.8 GHz) radio-frequency teristics by the use of HP4291B (1 MHz–1.8 GHz) radio-frequency impedance analyzer (measuring temperature range is −55–120° C.). FIG. 5 shows the magnetic spectrum curves of the samples. Initial permeability is 4–5, and cut-off frequency is above 1.8 GHz. FIG. 6 gives the corresponding quality factor curves. The property parameters of the samples are listed in Table 3, in which the meanings of the parameters are as follows:

$\mu_i$ is initial permeability of the material.
Q is quality factor of the material.
$(\alpha_\mu)_{rel}$ is relative temperature coefficient.
$\rho$ is electric resistivity of the material.

TABLE 3

| Sample | Sintering Condition | $\mu_i$ | Q (300 MHz) | $(\alpha_\mu)_{rel}$ (/° C.) | $\rho$ ($\Omega \cdot cm$) |
|---|---|---|---|---|---|
| 3-1 | 890° C./4 h | 4.5 | 45 | $1.7 \times 10^{-6}$ | $2.9 \times 10^9$ |
| 3-2 | 890° C./8 h | 4.8 | 40 | $3.2 \times 10^{-6}$ | $1.4 \times 10^9$ |

Embodiment 4

Figure 7:
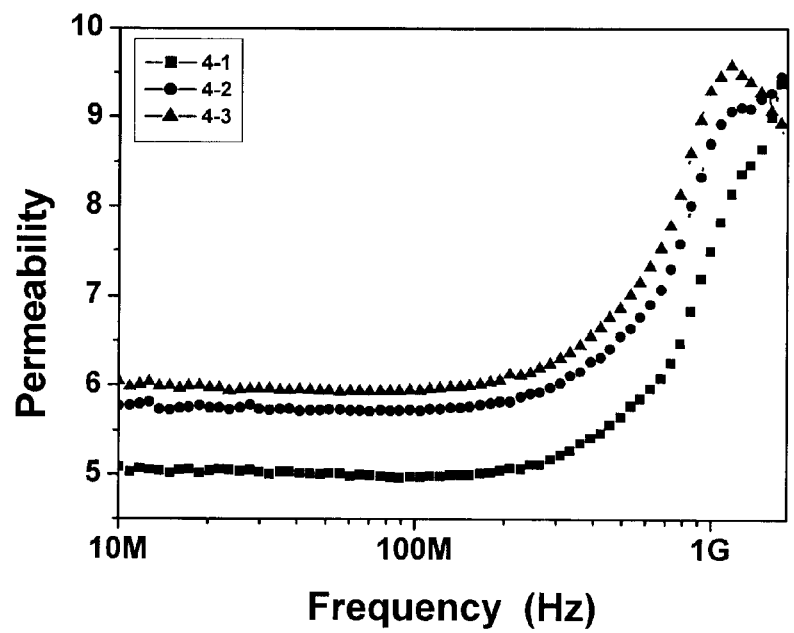
FIG. 7 is the magnetic spectrum curves of another group of samples by using this invention.
Figure 8:
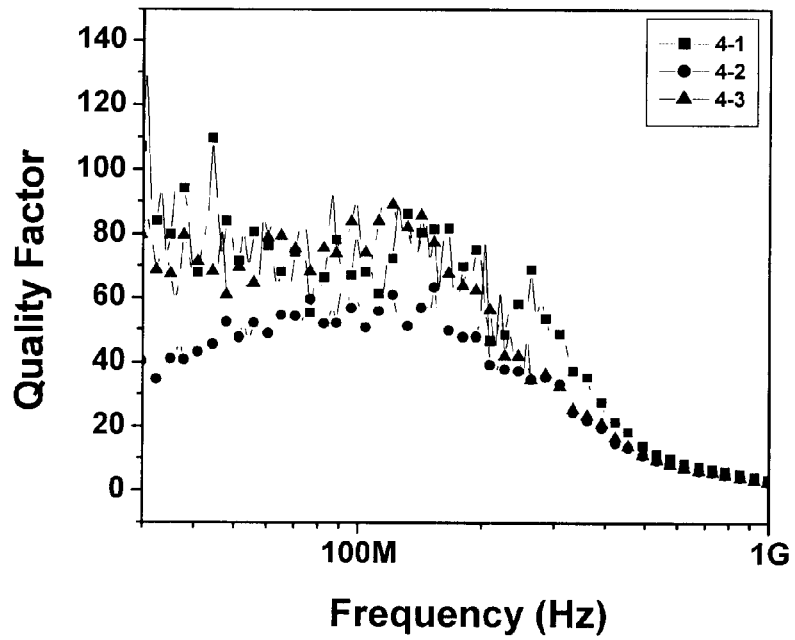
FIG. 8 is the quality factor curves corresponding to FIG. 7.

Using solid phase synthetic method to prepare planar hexagonal Z-type soft magnetic ferrite $Ba_{2.9}Sr_{0.1}Co_{1.4}Cu_{0.6}Fe_{23}Mn_{0.2}O_{39.8}$, where sintering aid is lithium fluoride, calcium fluoride, and bismuth oxide, and raw materials are BaO, SrO, CoO, CuO, $MnCO_3$, $Fe_2O_3$ taken according to stoichiometry ratio as 44.43 g, 1.04 g, 10.49 g, 4.77 g, 2.30 g, 183.6 g respectively. After mixed all these compositions, ball-grind for 24 hours. Baked dry, pre-calcining at 1,000–1,300° C. to form Z-type soft magnetic ferrite. Take ferrite powder 20 g each; add sintering aid of 5% in weight of all compositions; ball-grind for 24 hours;

bake dry; sieve with 100–200 mesh screen; moulding; sintering at 860° C., 890° C., and 920° C. for 6 hours each and mark sample 4-1, 4-2, and 4-3 respectively. For circular ring samples, their outer diameter is 20 mm; inner diameter, 10 mm; thickness, 3 mm; and forming pressure, 7 MPa. For circular sheet samples, their diameter is 10 mm; thickness, 1 mm; and forming pressure, 2 MPa. The sintered ceramic sheets are measured for electric resistivity after coated with silver on upper and lower surfaces. The sintered circular ring samples are measured for magnetic spectrum and temperature characteristics by the use of HP4291B (1 MHz–1.8 GHz) radio-frequency impedance analyzer (measuring temperature range is –55–120° C.). FIG. 7 shows the magnetic spectrum curves of the samples. Initial permeability is 5–6, and cut-off frequency is above 1.8 GHz. FIG. 8 gives the corresponding quality factor curves. The property parameters of the samples are listed in Table 4, in which the meanings of the parameters are as follows:

$\mu_i$ is initial permeability of the material.

Q is quality factor of the material.

$(\alpha_\mu)_{rel}$ is relative temperature coefficient.

$\rho$ is electric resistivity of the material.

TABLE 4

| Sample | Sintering Condition | $\mu_i$ | Q (300 MHz) | $(\alpha_\mu)_{rel}$ (/° C.) | $\rho$ ($\Omega \cdot cm$) |
|---|---|---|---|---|---|
| 4-1 | 860° C./6 h | 5.1 | 55 | $8.9 \times 10^{-7}$ | $8.2 \times 10^8$ |
| 4-2 | 890° C./6 h | 5.8 | 40 | $7.3 \times 10^{-7}$ | $2.7 \times 10^9$ |
| 4-3 | 920° C./6 h | 6.1 | 40 | $5.9 \times 10^{-7}$ | $4.4 \times 10^9$ |

The above practical examples show that multi-layer chip inductor material of high performance used in very high frequencies can be obtained. By adding sintering aid, 900° C. low temperature sintering can be realized with high ceramic density and uniform grains averaging 1–2 micrometers in grain diameter. Through the adjustment of formula and process, the initial permeability of the material can cover a range of 2–10, with cut-off frequencies over 1.5 GHz, relative temperature ratio not greater than $10^{-6}$/° C., quality factors larger than 40, and electric resistivity exceeding $10^9 \Omega \cdot cm$. The materials prepared with this invention is a multi-layer chip inductor material with huge application prospects in very high frequencies, by which multi-layer chip inductor elements of high performance can be manufactured for use in very high frequencies.

What is claimed is:

1. A multi-layer chip inductor material of high performance, used in very high frequencies, comprising about 88–99%, based on the total weight of the material of a main component of a planar hexagonal soft magnetic ferrite of the formula $Ba_{3-x}Sr_xCo_{2-y-z}Zn_zCu_yMn_wFe_{24-w-v}O_{41}$, where $0 \leq x \leq 2$, $0 \leq y \leq 2$, $0 \leq z \leq 2.0$, $0 < w \leq 1.0$, and $0 \leq v \leq 1.0$; and about 1–12%, based on the total weight of the material of a secondary doped sintering aid selected from the group consisting of bismuth oxide, vanadium oxide, cadmium oxide, calcium oxide, silicon oxide, lead oxide, boron oxide, lead fluoride, lithium fluoride, calcium fluoride, lithium carbonate, lithium borate, a boron-lead glass, and mixtures thereof.

2. A method for preparing the multi-layer chip inductor material of high performance used in very high frequencies according to claim 1, wherein a solid phase reaction synthetic method is used, of which the following steps are included:

(1) synthesizing of main composition, planar hexagonal soft magnetic ferrite: on the basis of the molecular formula, select raw material from $Fe_2O_3$, $SrCO_3$ or SrO, $BaCO_3$ or BaO, $Co_3O_4$ or CoO, ZnO, CuO, $Mn_2O_3$ or $MnO_2$ or $MnCO_3$; weigh according to molecular formula stoichiometry ratio; ball grind for 2–48 hours after mixing, taking water as the medium;

(2) bake dry the size obtained by ball grinding in step (1), and pre-calcining at 1000–1300° C., resulting in main composition type Z: planar hexagonal soft magnetic ferrite;

(3) mixing secondary doped sintering aid with the main composition according to formula and ball grind for 2–48 hours with water as medium;

(4) bake dry the slurry obtained in step (3), sieve with 100–200 mesh size, granulate, and moulding;

(5) sintering at 860–920° C. for 1–10 hours.

3. A multi-layer chip inductor material according to claim 2, further comprising the secondary doped sintering aid selected from the group consisting of lithium fluoride, calcium fluoride, and bismuth oxide.

* * * * *